United States Patent

Grohs et al.

[11] Patent Number: 5,592,974
[45] Date of Patent: Jan. 14, 1997

[54] FLUID FLOW RESTRICTOR

[75] Inventors: David D. Grohs, Canton; Fred G. Schroeder, Grosse Ile, both of Mich.; Pamela K. Blanco, Richmond, Ind.

[73] Assignee: Ford Motor Company, Dearborn, Mich.

[21] Appl. No.: 498,382

[22] Filed: Jul. 5, 1995

[51] Int. Cl.⁶ .............................. F15D 1/02; F16L 21/00
[52] U.S. Cl. ..................... 138/44; 138/45; 138/40; 285/398
[58] Field of Search .................... 138/37, 40, 41, 138/43, 44, 45; 285/398, 239; 29/451

[56] References Cited

U.S. PATENT DOCUMENTS

| | | | |
|---|---|---|---|
| 161,492 | 3/1875 | Dayton | 285/398 X |
| 1,625,867 | 4/1927 | Plant | 138/44 |
| 1,776,741 | 9/1930 | Schwab | 138/44 |
| 1,802,766 | 4/1931 | Kerr | 138/44 |
| 2,816,572 | 12/1957 | Pratt | 138/45 X |
| 2,891,578 | 6/1959 | Dahl et al. | 138/45 |
| 2,899,979 | 8/1959 | Dahl et al. | 138/45 |
| 3,018,799 | 1/1962 | Volkmann et al. | 138/44 X |
| 3,077,903 | 2/1963 | Honsinger | 138/45 |
| 3,087,747 | 4/1963 | Novotny | 285/398 |
| 4,762,150 | 8/1988 | Kokuryu | 138/44 |
| 4,915,135 | 4/1990 | Kellenbarger et al. | 138/44 |

*Primary Examiner*—David Scherbel
*Assistant Examiner*—Patrick F. Brinson
*Attorney, Agent, or Firm*—Raymond L. Coppiellie

[57] ABSTRACT

A restrictor for limiting the volume of fluid flowing from an automotive hose into a heat exchanging device in an automotive heating or air-conditioning system is disclosed. The restrictor includes a generally cylindrical, hollow body disposed in the hose and a flow limiting washer disposed in the body. The body includes an annular wall having a stepped region of reduced cross-sectional area which receives a hose clamp therein to prevent sliding and rotation of the restrictor within the hose.

3 Claims, 1 Drawing Sheet

FLUID FLOW RESTRICTOR

BACKGROUND OF THE INVENTION

1. Field of the Invention

The present invention relates generally to a flow restrictor. More particular the present invention relates to a flow restrictor for limiting the amount of fluid flow to a heat exchanging device in an automotive heater or air-conditioning system.

2. Disclosure Information

Devices for controlling the rate of flow of a fluid at varying line pressures are utilized in a variety of applications, such as automotive heating systems, fuel systems, water cooling equipment and heat exchangers. For example, it has been well known to limit the amount of fluid flowing into an automotive heat exchanger, such as a heater core, to prevent the premature corrosion and wearing of the heat exchange device. However, it is necessary that fluid flowing between adjacent heat exchanging devices may have different requirements. For this reason, it is known to put in a flow control device such as a restrictor in an automotive hose between adjacent heat exchanging devices.

Typically, the restrictor comprises a generally cylindrical body having a flow control washer disposed at one end thereof. However, problems often arise with the generally cylindrical type of restrictor in that the restrictor often moves along the hose or becomes misaligned such that the flow opening is not parallel to the direction of fluid flow thus causing inefficient fluid flow. Furthermore, when one of the heat exchangers is backflushed, the flow control washer within the restrictor is often ejected out of the restrictor making it necessary to replace the entire restrictor. Therefore, it would be advantageous to provide a restrictor for limiting the amount of flow to an automotive heat exchanger which does not move axially or radially within the hose and which prevents a flow control washer from being ejected out of the restrictor during backflushing of the system.

SUMMARY OF THE INVENTION

The present invention solves the above problems with the prior art by providing a restrictor for limiting the volume of a fluid flowing through an automotive hose into heat exchanging device in an automotive heater or air-conditioning system, the restrictor being secured in the hose by an adjustable clamp. The restrictor comprises a generally cylindrical, hollow body disposed in the hose and having a fluid inlet end and a fluid exit end and a flow limiting washer disposed in the body. The body includes an annular wall having a predetermined wall thickness in which defines a fluid passage, the wall having an exterior surface and an interior surface. The exterior surface of the body includes a stepped region of reduced cross-sectional area which receives the clamp therein. The body further includes a valve seat defined at the exit end of the body, the valve seat being configured to receive the flow limiting washer therein, whereby the pressure of fluid exiting the exit end of the restrictor is less than the pressure of fluid entering the inlet end of the restrictor. In one embodiment, the annular wall includes a tapered cross-section such that the wall thickness increases from the fluid inlet end to a shoulder disposed a predetermined distance from the fluid exit end.

It is an advantage of the present invention that the flow control washer will not be ejected from the restricted during backflushing of the fluid through the restrictor and that the restrictor does not move axially or radially within the automotive hose. These and other objects, features, and advantages of the invention will be described by the drawings, detailed description and claims which follow.

DETAILED DESCRIPTION OF THE PREFERRED EMBODIMENTS

Figure 1:
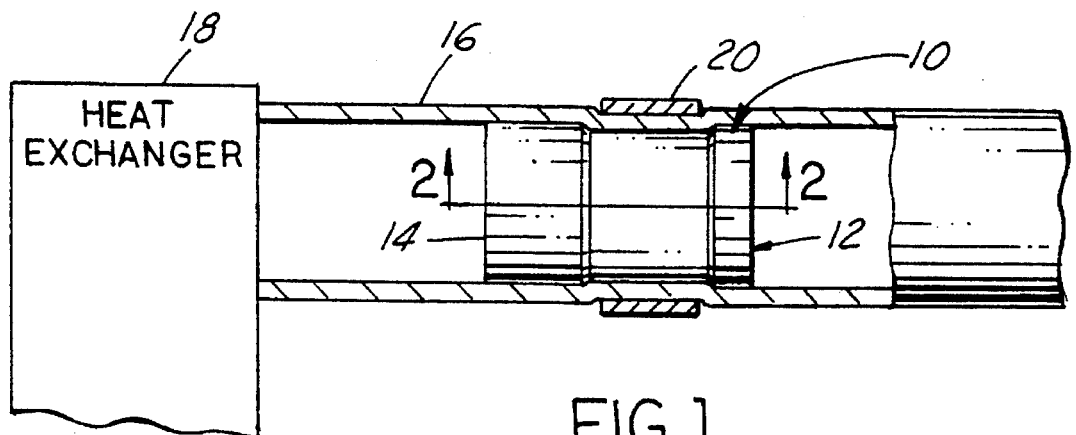
FIG. 1 is a perspective, partially schematic view of the restrictor of the present invention.

Referring now to the drawings, FIG. 1 shows a restrictor 10 disposed within an automotive hose 16 connected to an automotive heat exchanger, such as a heater core 18. The restrictor has a fluid inlet end 12 and a fluid exit end 14 leading to the heat exchanger such that the fluid pressure exiting the exit end 14 is less than the fluid pressure entering the inlet end 12 of the restrictor 10. It is known in the automotive air-conditioning art that it is desirable to limit the amount of flow and pressure flowing to certain heat exchangers to prevent premature corrosion and/or wearing out of the heat exchanger component. As shown in FIG. 1, the restrictor 10 is held in place within the hose 16 by an adjustable clamp 20 or any other suitable retention means, the designs of which are well known in the art. The clamp 20 secures the restrictor 10 in a predetermined location within the hose and prevents the restrictor 10 from sliding axially or radially within the hose 16.

Figure 2:
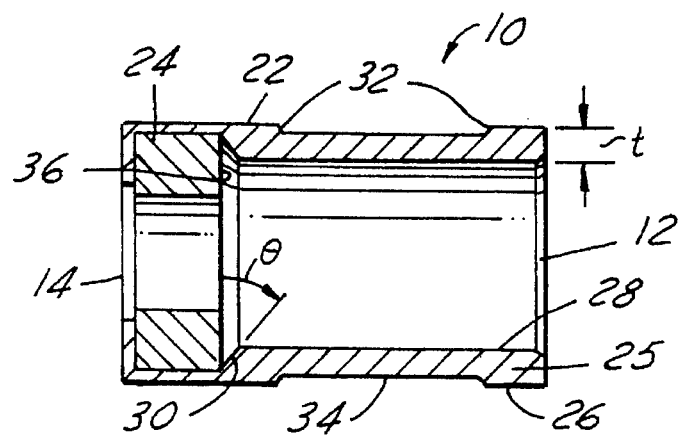
FIG. 2 is a cross-sectional view taken along line 2—2 of FIG. 1.

FIG. 2 shows a cross-sectional view of the restrictor 10 of FIG. 1. The restrictor 10 comprises a generally cylindrical, hollow body 22 and a flow limiting washer 24 disposed at one end of the body 22. The flow limiting washer typically is made from an elastomeric material such as rubber and which is available from the Robertson and Stewart Company of Michigan. As can be seen in FIG. 2, the body 22 includes an annular wall 25 having an exterior surface 26 and an interior surface 28. The wall 25 has a predetermined thickness, t. The exterior surface 26 of the body 22 includes a stepped region a reduced cross-sectional area being defined by pair of spaced apart exterior shoulders 32. The shoulders define a generally annular flat space 34 therebetween and it is this space which the clamp 20 engages to prevent axial and radial movement of the restrictor 10 within the hose 16. The interior surface 28 of the annular wall 25 defines an interior shoulder 30 disposed at a predetermined angle θ relative to an axis perpendicular to the fluid flow axis through the center of the restrictor 10. This predetermined angle θ generally is between 25 to 35 degrees and in the preferred embodiment is disposed at approximately 30 degrees. By disposing this interior shoulder 30 at a predetermined angle, insertion of the flow limiting washer 24 can be performed easily.

At the exit end 14 of the restrictor 10, the flow limiting washer 24 is disposed within a valve seat 36. The valve seat 36 is defined by the exit end 14 of the restrictor and the interior shoulder 30. As described above, the flow limiting washer 24 sits within the valve seat 36.

Figure 3:
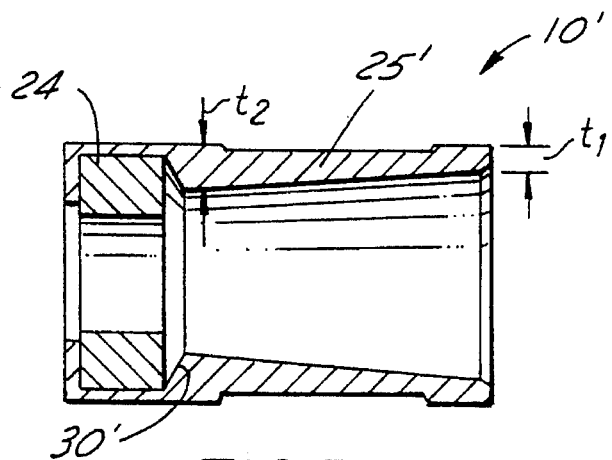
FIG. 3 is a cross-sectional view of an alternative embodiment restrictor similarly taken along line 2—2 of FIG. 1.

FIG. 3 shows an alternative embodiment of the restrictor and is structured generally similar to that described above with reference to FIG. 2. However, the annular wall 25' of the restrictor 10' has a tapering thickness such that the thickness $t_1$, at the inlet end 12 is less than the thickness of annular wall $t2$ at the interior shoulder 30'. By tapering the wall thickness in this manner, the flow limiting washer 24 is further prevented from being forced out of the inlet end of the restrictor.

Various modifications and alterations of the present invention are no doubt within the scope of the present invention. For example, the restrictor can be manufactured from a number of different materials, such as metal, synthetic polymeric materials such as nylon or many other materials available to those filled in the air. The length of the restrictor is determined by the size of the clamp to be utilized and the flow limiting washer can have many different diameters depending upon application for which it is intended. It is the following claims, including all equivalents which define the scope of the invention.

What is claimed is:

1. A restrictor for limiting the volume of a fluid flowing through an automotive hose into a heat exchanging device in an automotive heating system, the restrictor being secured in the hose by an adjustable clamp, comprising:

a generally cylindrical, hollow body disposed in the hose and having a fluid inlet end and a fluid exit end;

said body including an annular wall of predetermined thickness which tapers from a lesser thickness at the fluid inlet end to a greater thickness at an interior shoulder disposed a predetermined distance from the fluid exit end so as to define a tapering fluid passage of decreasing diameter, wherein the interior shoulder is disposed toward said inlet end at a predetermined angle between 25 and 35 degrees relative to an axis perpendicular to a fluid flow axis through said restrictor, said wall having an exterior surface and an interior surface, the exterior surface of the body including a stepped region of reduced cross-sectional area, said stepped region including a pair of spaced-apart exterior shoulders defining a generally annular space therebetween, said space being configured to engage said hose when said clamp is secured therearound;

a flow limiting washer disposed in said body, wherein the diameter of said washer is greater than the diameter of the annular wall at the interior shoulder of said body, such that said washer abuts said interior shoulder when said fluid flows from said exit end toward said inlet end of said body; and a valve seat defined at the exit end of the body, the valve seat being configured to receive said flow limiting washer therein, whereby the fluid pressure exiting the exit end of the restrictor is less than the fluid pressure entering the inlet end of the restrictor.

2. A restrictor according to claim 1, wherein said restrictor is fabricated from a metal alloy.

3. A restrictor according to claim 1, wherein said body has a predetermined longitudinal length.

* * * * *